United States Patent
Landrum

(10) Patent No.: US 7,442,231 B2
(45) Date of Patent: Oct. 28, 2008

(54) ELECTRICITY GENERATION SYSTEM

(75) Inventor: J. Mark Landrum, Tulsa, OK (US)

(73) Assignee: Syntroleum Corporation, Tulsa, OK (US)

( * ) Notice: Subject to any disclaimer, the term of this patent is extended or adjusted under 35 U.S.C. 154(b) by 533 days.

(21) Appl. No.: 11/209,054

(22) Filed: Aug. 22, 2005

(65) Prior Publication Data

US 2006/0065119 A1 Mar. 30, 2006

Related U.S. Application Data

(60) Provisional application No. 60/603,574, filed on Aug. 23, 2004.

(51) Int. Cl.
*B01D 53/047* (2006.01)
*B01D 53/22* (2006.01)

(52) U.S. Cl. ............................. 95/45; 95/96

(58) Field of Classification Search ............... 95/45, 95/50, 51, 96, 130, 139, 232, 236, 902; 96/9; 62/611–614; 502/64; 60/39.12, 781, 784
See application file for complete search history.

(56) References Cited

U.S. PATENT DOCUMENTS

| | | | |
|---|---|---|---|
| 4,152,217 A | 5/1979 | Eisenberg et al. | 203/2 |
| 4,597,777 A * | 7/1986 | Graham | 95/51 |
| 4,730,118 A | 3/1988 | Quarles et al. | 290/40 R |
| 5,174,796 A | 12/1992 | Davis et al. | 55/26 |
| 5,390,499 A * | 2/1995 | Rhoades et al. | 62/614 |
| 5,411,721 A * | 5/1995 | Doshi et al. | 423/220 |
| 5,617,741 A | 4/1997 | McNeil et al. | 62/622 |
| 5,792,239 A | 8/1998 | Reinhold, III et al. | 95/101 |
| 6,035,641 A * | 3/2000 | Lokhandwala | 60/649 |
| 6,161,386 A * | 12/2000 | Lokhandwala | 60/649 |
| 6,425,267 B1 * | 7/2002 | Baker et al. | 62/624 |
| 6,447,578 B1 | 9/2002 | Ciccarelli | 95/179 |
| 6,565,626 B1 * | 5/2003 | Baker et al. | 95/47 |
| 6,572,678 B1 | 6/2003 | Wijmans et al. | 95/47 |
| 6,601,543 B2 * | 8/2003 | Rautenbach et al. | 123/3 |
| 6,630,012 B2 | 10/2003 | Wegeng et al. | 95/106 |
| 6,631,626 B1 | 10/2003 | Hahn | 62/612 |
| 7,314,503 B2 * | 1/2008 | Landrum et al. | 95/50 |
| 2005/0139072 A1 | 6/2005 | Landrum et al. | 95/96 |

* cited by examiner

*Primary Examiner*—Frank M Lawrence

(57) ABSTRACT

An electricity generation system is disclosed for utilization with a natural gas purification system. In one embodiment, a gas-driven engine which is substantially powered by a low-BTU gas produced in a natural gas purification process is mechanically coupled to an electric motor and is utilized to drive the electrical motor. The electric motor generates electrical energy that can be utilized to power substantially all or a portion of the purification process' electrical load. The generated electricity may be used to supply major or minor loads of the gas purification process.

10 Claims, 2 Drawing Sheets

ELECTRICITY GENERATION SYSTEM

CROSS REFERENCE TO RELATED APPLICATIONS

This application claims the benefit of U.S. Provisional Application No. 60/603,574, filed on Aug. 23, 2004. The disclosure of the aforementioned provisional application is incorporated by reference in its entirety herein.

FIELD OF THE INVENTION

This invention relates to electrical power generation systems in general and in particular to electrical power generation systems which are suitable for utilization in conjunction with natural gas purification systems.

BACKGROUND OF THE INVENTION

Many of the world's remaining natural gas reserves contain relatively high values of inerts, such as nitrogen gas and carbon dioxide. The presence of such inerts lowers the BTU value of the natural gas making it unsuitable as pipeline quality gas. In addition, the presence of both water and carbon dioxide may make the natural gas corrosive. In order to meet specifications for use such as pipeline quality specifications, these inerts must be wholly or substantially removed. Typical pipeline quality specifications mandate a total combined nitrogen and carbon dioxide content of less than about 6%.

Natural gas purification processes utilize numerous subprocesses which must be powered. For example, natural gas purification processes may include feed gas compression, recompression, sales gas compression, recycle gas compression, and various pumping processes. Moreover, inert removal processes generally utilize process equipment powered by electricity, including for example, heat tracing, instrumentation and controls, instrument air compression, dryers, and process plant lighting. These devices are generally operated utilizing either electric power from an existing electrical power distribution system or by an internal combustion engine powered by diesel or other appropriate fuel.

While electrically powered systems are generally reliable and require little maintenance, the cost of generating electrical power is rapidly increasing. Therefore, the cost of operating a large inert removal process or a large number of such processes which use electrically powered equipment (e.g., compressors) could be excessive or prohibitive. Moreover, many natural gas reserves are in remote locations at which utility electricity is not available. In such locations, the cost of supplying appropriate generator fuel could also be excessive or prohibitive.

Therefore, there exists a need for a power generation system which combines the economic advantages of a gas engine system with the relative reliability of electrical systems.

SUMMARY OF THE INVENTION

Some embodiments of the invention provide an improvement for a gas purification process which produces one or more low BTU-value streams wherein the improvement includes the acts of: (1) feeding the one or more low BTU-value streams to a gas engine-driven motor wherein the gas engine-driven motor is mechanically coupled to an electrical generator; (2) generating electricity in the electrical generator; and (3) using the generated electricity to power one or more electrical loads of the gas purification process.

According to one embodiment of the present invention, an improvement to a gas purification process having one or more electric loads wherein one or more low-BTU streams are produced is disclosed. The improvement comprises feeding the one or more low-BTU streams to a gas-driven engine wherein the gas-driven engine is mechanically coupled to an electric generator. Electricity is generated in the electric generator. The generated electricity is used to power the one or more electric loads of the gas purification process.

According to yet another embodiment of the present invention, a process to purify a natural gas stream comprising between about 25% and about 60% total inerts is disclosed. The process comprises the act of treating the natural gas stream with a first-stage process. The first-stage process comprises one or more processes of the group of (i) selective membrane filtration, (ii) cryogenic distillation, and (iii) amine scrubbing. The first-stage process produces a semi-purified natural gas stream comprising less than or equal to about 30% total combined inerts. The process further comprises the act of treating the semi-purified natural gas stream with a second-stage process in a pressure swing adsorption unit. The pressure swing adsorption unit has one or more adsorbent beds having CTS-1 molecular sieve to obtain a product natural-gas stream comprising less than about 5% total combined inerts. The process further comprises the act of recovering a low-BTU stream from either or both of the first-stage process or the second-stage process. The process further comprises the act of feeding the low-BTU stream to a gas-driven engine. The gas-driven engine is mechanically coupled to an electric generator. The process further comprises the acts of generating electricity via the electric generator and using at least some of the generated electricity to power either or both of the first-stage process or the second-stage process.

The above summary of the present invention is not intended to represent each embodiment, or every aspect, of the present invention. Additional features and benefits of the present invention are apparent from the detailed description, figures, and claims set forth below.

Figure 1:
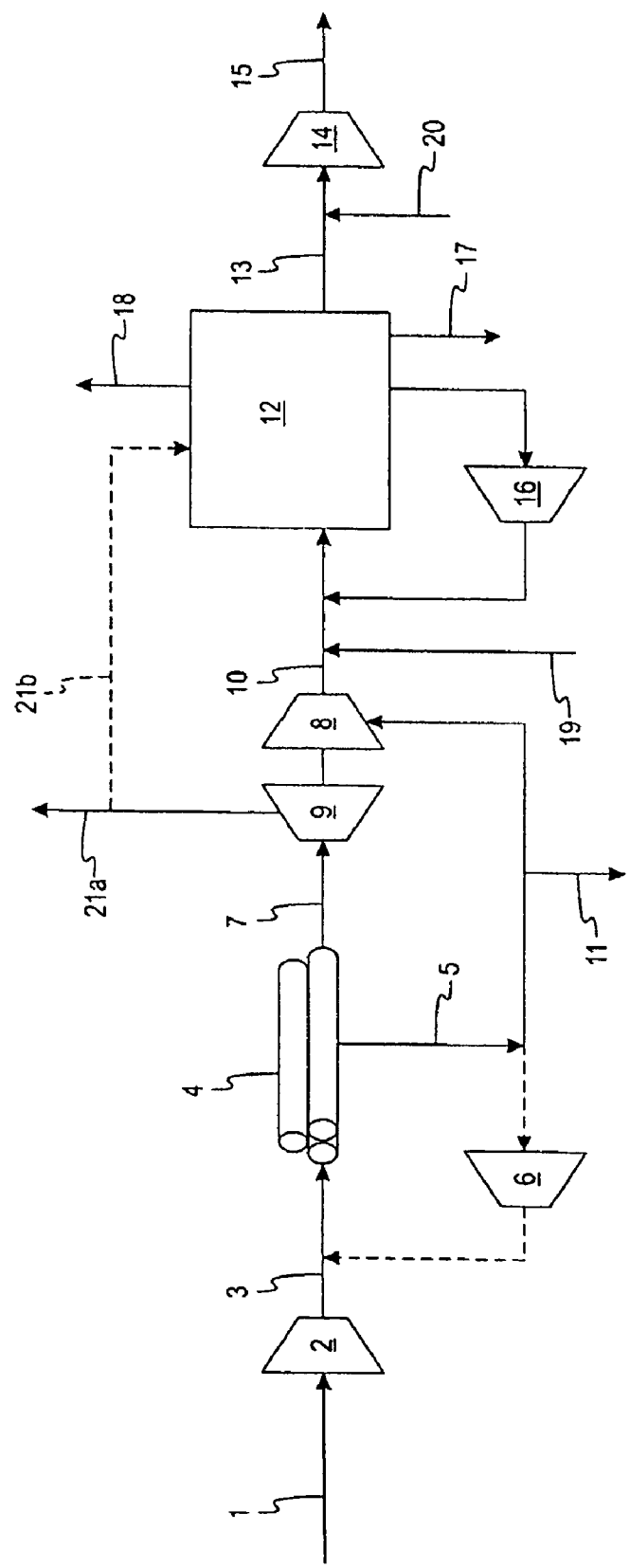
FIG. 1 is a schematic of a natural gas purification system useful in the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF EMBODIMENTS OF THE INVENTION

The terms "inerts," and "inert compounds" are used interchangeably herein. As used herein, inerts comprise nitrogen gas, carbon dioxide, and helium.

The term "low BTU value stream" means a methane-containing stream having a BTU value of between about 250 BTU/scf and about 500 BTU/scf.

A number of techniques are used to remove inerts from natural gas streams so as to produce higher BTU valve natural gas, preferably pipeline quality gas. Such inert removal (i.e., purification methods) include the use of selective membranes, pressure or thermal swing adsorption units, cryogenic separation, countercurrent heat exchangers, stripper columns, and amine-containing absorbents. Inert removal processes further include, for example, those disclosed in U.S. Pat. Nos. 4,152,217; 5,617,741; 6,630,012; 5,174,796; 6,572,678; 6,631,626; 6,447,578; and 5,792,239, each of which is incorporated herein by reference in its entirety. The terms "inert removal" and "gas purification" are used interchangeably herein.

One or more inert removal methods may be employed depending upon the types and amounts of inerts present in a particular natural gas reserve. In some instances, a first stage removal process may be used to remove one inert (e.g., nitrogen) and a second stage removal process used to remove a second inert (e.g., carbon dioxide).

One exemplary natural gas purification system which may be used in connection with the electricity generation system of the present invention is disclosed in commonly-owned U.S. Application Publication No. 2005/0139072, published on Jun. 30, 2005, and entitled "Process to Remove Nitrogen and/or Carbon Dioxide from Methane-Containing Streams," which is incorporated herein by reference in its entirety.

Alternatively, other process schemes may be used, depending on which inert predominates—generally nitrogen or carbon dioxide—on (1) the pressure of the raw natural gas to be upgraded by the inerts removal process, and (2) the pipeline quality specifications for the product gas. Treatment processes useful in the inerts removal process include selective membrane filtration and non-membrane gas separation processes, for example, pressure swing adsorption processes utilizing crystalline titanosilicates or activated carbon materials. Yet other gas purification schemes useful in the invention include hybrid or multiple configurations comprising, for example, a first-stage removal process such as selective membrane filtration, cryogenic distillation, or amine scrubbing and a second-stage inerts removal process that utilizes pressure swing adsorption, amine scrubbing, or membrane separation. Among the types of electrical loads commonly utilized in gas purification processes include heat tracing, instrumentation and controls, instrument air compression, heated drying, and process plant lighting. In addition, electrical power is commonly required—depending upon the gas purification scheme—for major electrical loads such as inlet gas compression, recompressors, sales gas compression, recycle gas compression, air-cooled exchangers, amine charge pumps, reflux pumps, and vacuum pumps. By utilizing low heating value gas sources (e.g., nitrogen-rich and/or carbon dioxide-rich tail gas or waste gas) to generate electricity, the power for both the major and smaller loads may be provided more facilely and economically than utilizing direct gas engine drives or purchased electric power.

FIG. 1 illustrates an exemplary natural gas purification system which is useful in connection with the electricity generation system of the present invention. Referring to FIG. 1, a raw feed gas 1 is fed into a feed gas compressor 2. A compressed feed-gas stream 3 is fed into a first-stage membrane unit 4 containing a nitrogen selective membrane for which the permeate stream is methane. A membrane permeate stream 5 may be optionally recycled into the compressed feed-gas stream 3 following recompression by a membrane permeate compressor 6. A non-permeate stream 7 that is still under pressure and primarily contains nitrogen gas may be used to produce energy in a turbo expander 9. Following expansion in the turbo expander 9, an expanded non-permeate stream 21a (e.g., nitrogen gas) may be vented or, alternatively, a portion of the non-permeate stream 22b may be used as a purge gas in the second-stage swing adsorption unit 12 discussed below.

The raw feed gas 1 may be any methane-containing gas stream. In some embodiments of the invention, the raw feed gas 1 is a sub-pipeline-quality natural gas stream. In other embodiments of the invention, the raw feed gas 1 may be, for example, a casing gas.

One or more membrane separation steps may be used to remove inerts from the raw feed gas 1. In one embodiment of the invention, for example, the raw feed gas 1 is a natural gas containing about 45% nitrogen which is pressurized to a pressure between about 550 and 700 psia and then fed into a first membrane separation unit. A first permeate stream is recovered at a pressure of between about 50 and about 275 psia. The non-permeate stream may then be passed into a second membrane separation unit. A second permeate stream is collected and may then be recompressed and re-fed into the first membrane separation unit. Alternatively, the second permeate could be fed to the suction of a feed compressor. The non-permeate stream from the second membrane separation unit may have about 85% to about 90% methane recovery and a pressure of about 50 psia. That is, the methane loss in a two membrane, first-stage membrane removal step may be up to about 15%.

The energy produced in the turbo expander 9 may be used to power a second-stage feed-gas booster compressor 8. All or part of the membrane permeate stream 5 may be recovered as a low BTU value combustion turbine or gas engine fuel 11. Alternatively, all or part of membrane permeate stream 5 may be re-pressurized in the second-stage feed-gas booster compressor 8. The re-pressurized membrane permeate stream, now a second-stage feed-gas stream 10, is then fed into a second-stage swing adsorption unit 12 wherein a nitrogen and/or carbon dioxide selective adsorbent is used. Pressure swing adsorption units generally consist of several adsorbent beds so that at least one bed is operational for removing inerts at all times. Although use of two or more adsorbent beds are preferred for operating efficiency, it is not necessary to have several beds and the present invention is intended to include processes having one or more adsorbent beds in the second-stage swing adsorption unit 12. Methane loss through the second-stage swing adsorption unit 12 may be up to about 25%.

A first associated or non-associated gas stream 19 may be added to the second-stage feed-gas stream 10 to provide a blended gas. A product gas 13 is recovered from the second-stage swing adsorption unit 12. The product gas 13 may be re-pressurized by a sales-gas compressor 14 prior to injection into sales-gas pipeline 15. A second associated or non-associated gas stream 20 may be added to the product gas 13 to provide a blended gas. Generally, such addition occurs before re-pressurization.

A portion of a tail gas 18 may be optionally removed from the second-stage swing adsorption unit 12 and vented. A low-BTU fuel stream 17 may also be removed from the second-stage swing adsorption unit 12. Such low BTU value fuel may be used, for example, as a gas engine fuel. Alternatively, the low-BTU fuel stream 17 or the tail gas 18 may be recompressed by a second-stage recycle compressor 16 and then fed into the second-stage feed-gas stream 10.

A number of compressors may be used in a natural gas purification scheme. For example, the system described above and shown in FIG. 1, uses at least four compressors: (1) a feed gas compressor; (2) one or more recycle compressor(s); (3) a second stage feed gas booster compressor; and (4) a sales gas compressor. Gas purification systems generally produce one or more non-pipeline quality natural gas streams (individually or collectively referred to herein as "waste stream(s)"). For example, in the system shown in FIG. 1, each of the gas engine fuel 11, low-BTU fuel stream 17, and the tail gas 18 is a low BTU value stream, as defined herein.

Figure 2:
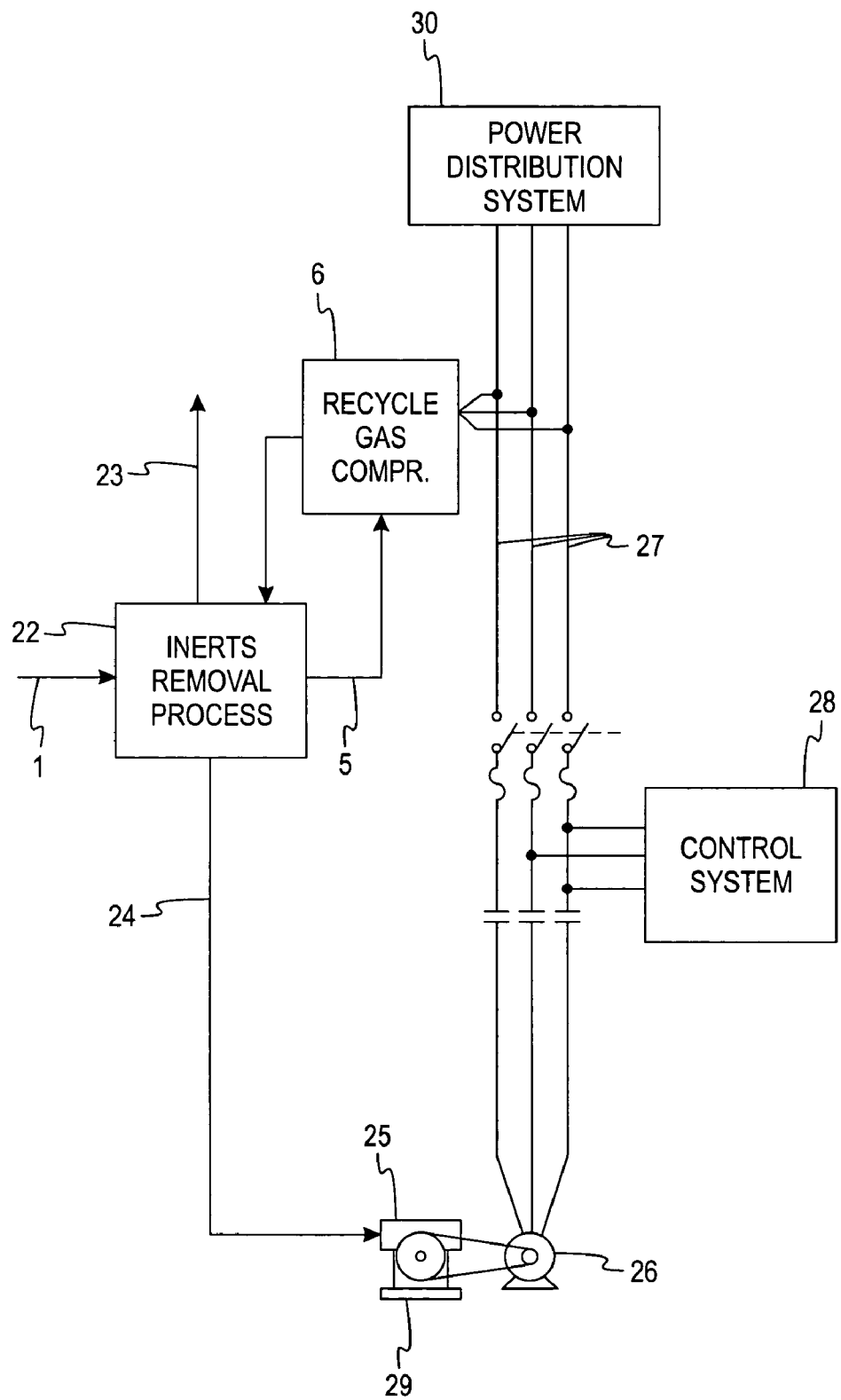
FIG. 2 is a schematic of an embodiment of the process of the present invention.

Embodiments of the invention utilize one or more such low BTU value streams to generate electricity. The generated electricity may, in turn, be used to power one or more of the compressors required by the gas purification process, or alternatively, to provide power to other process and utility system equipment, instrumentation and controls, and heat tracing. The low BTU value gas streams arising out of gas purification processes may be used to generate electricity either by induction generation or other technique, such as synchronous AC generators. FIG. 2 illustrates one embodiment of the generation system of the invention.

Referring now to FIG. 2, the raw feed gas 1 generally containing natural gas is fed into an inerts removal process 22, for example, the process illustrated in FIG. 1. The inerts removal process 22 produces a higher BTU value natural gas 23, from which at least a part of the inerts content of the raw feed gas 1 has been removed. The higher BTU value natural gas 23 may be pipeline quality gas. The inerts removal process 22 further produces one or more low-BTU streams 24. The low-BTU stream 24 generally contains one or more inerts and some amount of hydrocarbon gas, primarily methane. The low-BTU stream 24 has a BTU value less than the higher BTU value natural gas stream 23. In some embodiments of the invention, the low-BTU value stream 24 has a BTU value between about 250 BTU/scf and about 500 BTU/scf. In other embodiments of the invention, the low-BTU value stream 24 has a BTU value between about 270 BTU/scf and about 500 BTU/scf; between about 330 BTU/scf and about 400 BTU/scf; and between about 250 BTU/scf and about 400 BTU/scf.

In some embodiments of the invention, an amount of natural gas having a BTU value higher than that of the low-BTU value stream 24 may be added to the low-BTU value stream 24. Such amounts of natural gas are generally less than about 20% of the low-BTU value stream 24 fed to the electricity generation system. In some embodiments of the invention, the inerts removal process 22 may produce methane-containing streams having less than about a 500 BTU/scf heating value.

For example, in the system illustrated in FIG. 1, in those instances in which first-stage membrane unit 4 efficiently permeates methane, the non-permeate stream 7 may have a heating value significantly less than about 250 BTU/scf. The non-permeate stream 7 may be used as illustrated in FIG. 1 to produce energy in the turbo expander 9 or, alternatively, may be combined with sufficient natural gas to produce a low-BTU value stream 24 suitable for feeding into the electricity generation system.

Referring again to FIG. 2, the low-BTU value stream 24 is fed into an electrical power generation system that includes a gas-driven engine 25, an electric generator 26, one or more associated lines 27, and a control system 28. The low-BTU value stream 24 is burned in the gas-driven engine 25 that is mechanically coupled to the electric generator 26 by some means, for example, by sheaves and a drive belt 29. Any means of mechanically coupling the gas-driven engine 25 to the electric generator 26—such as belts, rods, or straps—are used in various embodiments of the invention.

The electric generator 26 is connected to an electrical power distribution system 30 through the associated lines 27. The associated lines 27 further connect the gas-driven engine 25 and the electric generator 26 to the control system 28. The control system 28 may monitor and control operation of the components of the electrical power generation system. For example, U.S. Pat. No. 4,730,118, issued Mar. 8, 1988, and entitled "Oil Field Induction Generator System" discloses an exemplary control system which is useful in the present invention. The full disclosure of U.S. Pat. No. 4,730,118 is incorporated herein by reference in its entirety.

The electricity generated by the electric generator 26 may be used to power various components used in the inerts removal process 22. As shown in FIG. 2, a recycle stream (e.g., permeate stream 5 of FIG. 1) may be recompressed by a compressor (e.g. permeate recycle compressor 6 of FIG. 1) and returned to the inerts removal process 22. FIG. 2 illustrates the recycle compressor 6 electrically connected to the associated lines 27 such that the recycle compressor 6 is powered by electricity generated by the electric generator 26.

The electric generator 26 may be any type of electrical generator including, for example, an induction A.C. generator, a synchronous A.C. generator, or a D.C. generator. U.S. Pat. No. 4,730,118, previously incorporated herein, discloses an induction generator system that may be incorporated into the present invention.

The gas-driven engine 25 may be any gas-driven engine capable of maintaining stable operations when fueled by a low-BTU stream. Exemplary gas-driven engines useful in the invention include, for example, models SFGLD 360 or SFGLD560, manufactured by Grupo Guascor, Vitora, Spain, and the various models of the Wankel rotary engine such as those manufactured by Wankel AG, Kirchberg, Germany. Suitable gas-driven engines for use in the invention generally include those engines not utilizing carburation.

What is claimed:

1. A process to purify a natural gas stream comprising between about 25% and about 60% total inerts, the process comprising the acts of:
    (a) treating the natural gas stream with a first-stage process comprising one or more processes of the group of selective membrane filtration, cryogenic distillation, and amine scrubbing to produce a semi-purified natural gas stream comprising less than or equal to about 30% total combined inerts;
    (b) treating the semi-purified natural gas stream with a second-stage process in a pressure swing adsorption unit having one or more adsorbent beds having CTS-1 molecular sieve to obtain a product natural-gas stream comprising less than about 5% total combined inerts;
    (c) recovering a low-BTU stream from either or both of the first-stage process or the second-stage process;
    (d) feeding the low-BTU stream to a gas-driven engine, the gas-driven engine being mechanically coupled to an electric generator;
    (e) generating electricity via the electric generator; and
    (f) using at least some of the generated electricity to power either or both of the first-stage process or the second-stage process.

2. The purification process of claim 1, wherein the gas-driven engine is mechanically coupled to the electric generator via a drive belt.

3. The purification process of claim 1, wherein the low-BTU stream is a tail gas produced by the second-stage process.

4. The purification process of claim 1, wherein the low-BTU stream is a gas engine fuel produced by the first-stage process.

5. The purification process of claim 1, wherein the electric generator is an A.C. generator.

6. The purification process of claim 1, wherein the electric generator is a D.C. generator.

7. The purification process of claim 1, wherein the low-BTU stream has a BTU value of between about 250 BTU/scf and about 500 BTU/scf.

8. The purification process of claim 1, wherein the low-BTU stream has a BTU value of between about 270 BTU/scf and about 500 BTU/scf.

9. The purification process of claim 1, wherein the low-BTU stream has a BTU value of between about 330 BTU/scf and about 400 BTU/scf.

10. The purification process of claim 1, wherein the low-BTU stream has a BTU value of between about 250 BTU/scf and about 400 BTU/scf.

* * * * *